United States Patent [19]
Fujisawa

[11] Patent Number: 5,014,124
[45] Date of Patent: May 7, 1991

[54] DIGITAL IMAGE PROCESSING APPARATUS

[75] Inventor: Tetsuo Fujisawa, Urawa, Japan

[73] Assignee: Ricoh Company, Ltd., Japan

[21] Appl. No.: 314,637

[22] Filed: Feb. 23, 1989

[30] Foreign Application Priority Data

| Feb. 25, 1988 | [JP] | Japan | 63-40612 |
| Feb. 29, 1988 | [JP] | Japan | 63-47097 |
| Jun. 14, 1988 | [JP] | Japan | 63-144785 |
| Oct. 12, 1988 | [JP] | Japan | 63-254818 |

[51] Int. Cl.$^5$ .......................... H04N 1/46; G03F 3/08
[52] U.S. Cl. .......................... 358/75; 358/80; 358/457; 358/462
[58] Field of Search .................. 358/75, 75 J, 78, 80, 358/455, 456, 457, 462, 467, 443, 298; 382/9

[56] References Cited

U.S. PATENT DOCUMENTS

| 4,183,013 | 1/1980 | Agrawala et al. | 382/9 |
| 4,447,830 | 5/1984 | Stoffel | 358/462 |
| 4,663,662 | 5/1987 | Sekizawa et al. | 358/443 |
| 4,707,745 | 11/1987 | Sakano | 358/298 |
| 4,876,610 | 10/1989 | Ohsawa | 358/456 |
| 4,914,524 | 4/1990 | Kimura | 358/462 |
| 4,958,218 | 9/1990 | Katayama et al. | 358/75 |

FOREIGN PATENT DOCUMENTS 0032475  1/1985  Japan .

Primary Examiner—Howard W. Britton
Assistant Examiner—Safet Metjahic
Attorney, Agent, or Firm—Mason, Fenwick & Lawrence

[57] ABSTRACT

A digital image processing apparatus includes first through sixth circuits. The first circuit divides digital input image data into a plurality of blocks, each block defining an area of a predetermined size. The second circuit detects a plurality of features of the divided digital image data for every pixel. The third circuit calculates, for every block, a quantity of each of the detected features supplied from the second circuit. The fourth circuit determines, for every block, the type of area of concern from the calculated quantity of each of the detected features supplied from the third circuit. The fifth circuit processes the digital image data in any one of a plurality of image processing modes, thereby producing output digital image data. The sixth circuit selects the most suitable image processing mode among the plurality of image processing modes on the basis of the determined type of the area supplied from the fourth circuit.

8 Claims, 20 Drawing Sheets

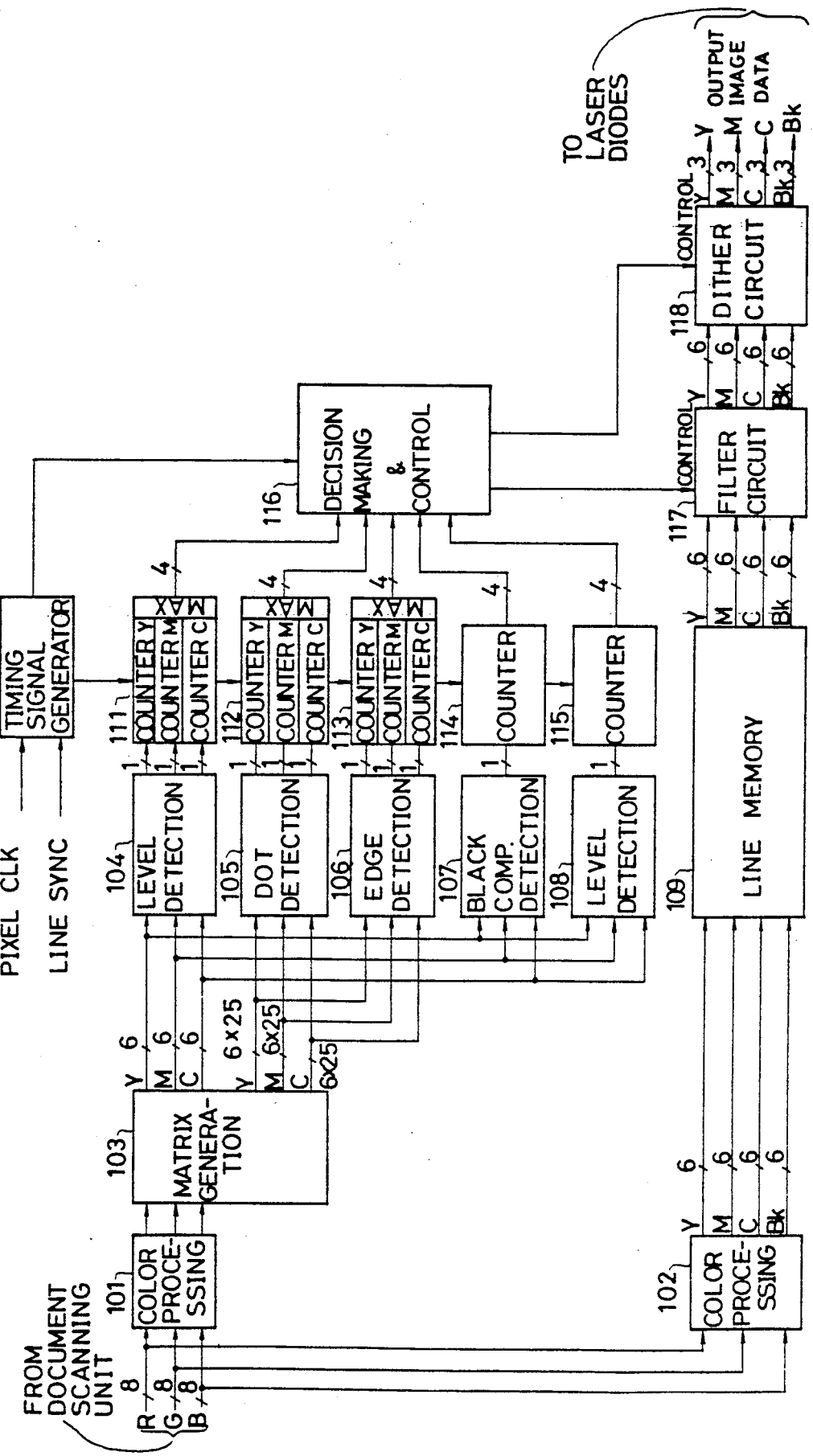

FIG.4B

| x | x | x | x | x |
|---|---|---|---|---|
| x | 0 | 0 | 0 | x |
| x | 0 | 1 | 0 | x |
| x | 0 | 0 | 0 | x |
| x | x | x | x | x |

FIG. 4C

| x | x | x | x | x |
|---|---|---|---|---|
| x | 1 | 1 | 1 | x |
| x | 1 | 0 | 1 | x |
| x | 1 | 1 | 1 | x |
| x | x | x | x | x |

FIG. 4D

| x | x | 0 | x | x |
|---|---|---|---|---|
| x | 0 | x | 0 | x |
| 0 | x | 1 | x | 0 |
| x | 0 | x | 0 | x |
| x | x | 0 | x | x |

FIG. 4E

| x | x | 1 | x | x |
|---|---|---|---|---|
| x | 1 | x | 1 | x |
| 1 | x | 0 | x | 1 |
| x | 1 | x | 1 | x |
| x | x | 1 | x | x |

FIG. 4F

| x a' | x b' | x c' | x d' | x e' |
|---|---|---|---|---|
| x f' | 0 g' | 0 h' | 0 i' | x j' |
| x k' | 0 ℓ' | 1 m' | 0 n' | x o' |
| x p' | 0 q' | 0 r' | 0 s' | x t' |
| x u' | x v' | x w' | x x' | x y' |

| 0 | 0 | 0 | 0 | 0 |
|---|---|---|---|---|
| 0 | 1 | 1 | 1 | 0 |
| 0 | 1 | -8 | 1 | 0 |
| 0 | 1 | 1 | 1 | 0 |
| 0 | 0 | 0 | 0 | 0 |

| 1 | 1 | 1 | 1 | 1 |
|---|---|---|---|---|
| 1 | 1 | 1 | 1 | 1 |
| 1 | 1 | -24 | 1 | 1 |
| 1 | 1 | 1 | 1 | 1 |
| 1 | 1 | 1 | 1 | 1 |

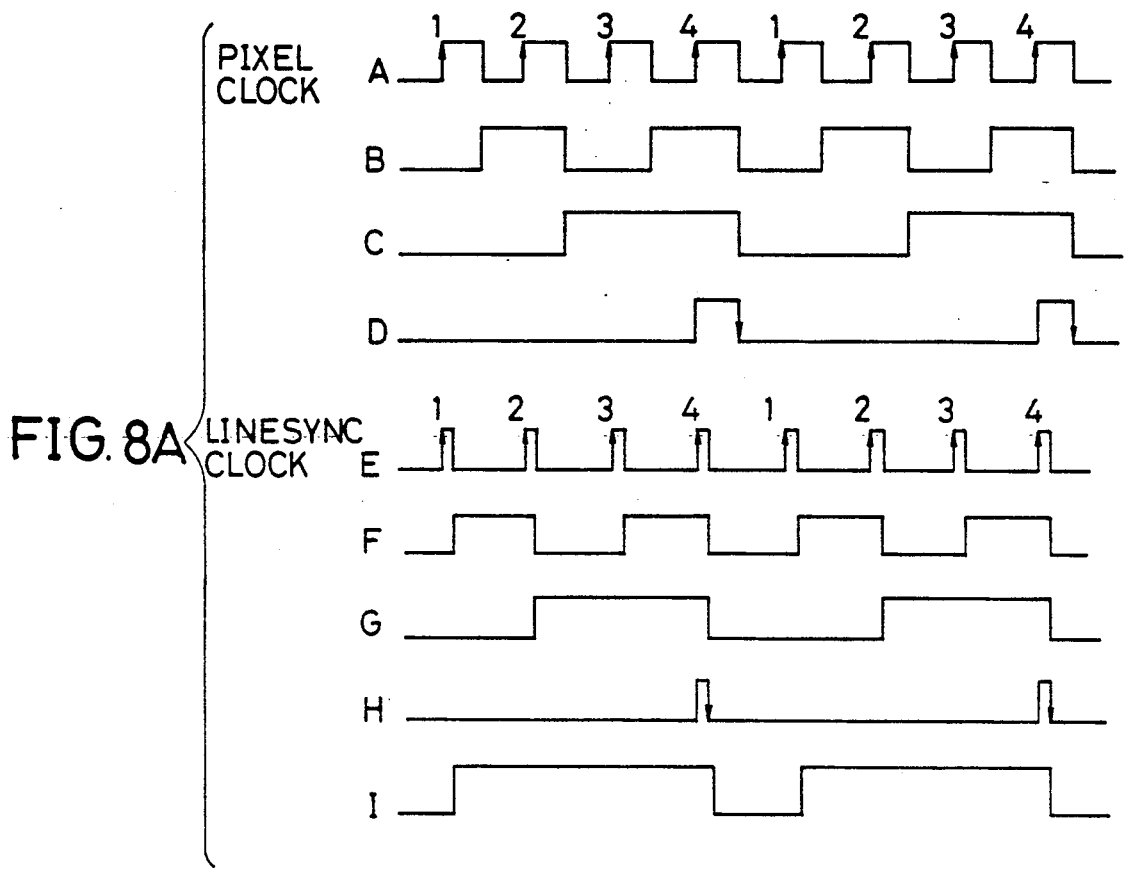
FIG. 8A
FIG. 8B
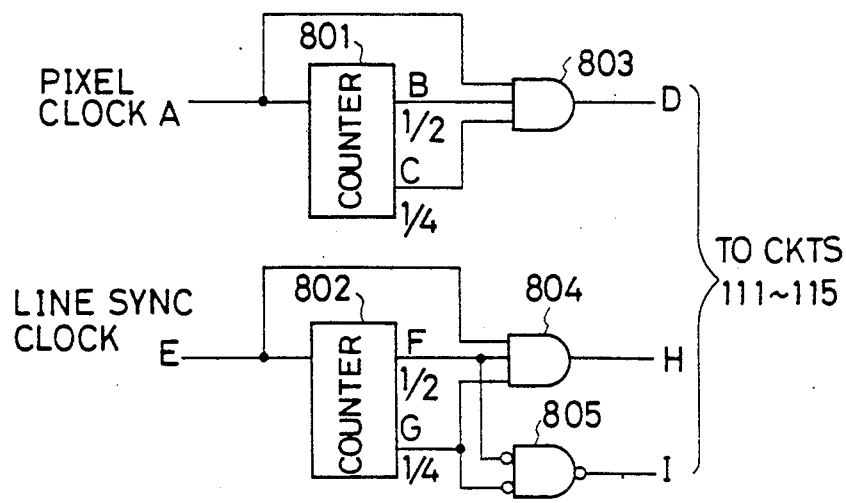

| $\frac{1}{36}$ | $\frac{1}{36}$ | $\frac{1}{36}$ | $\frac{1}{36}$ | $\frac{1}{36}$ |
|---|---|---|---|---|
| $\frac{1}{36}$ | $\frac{2}{36}$ | $\frac{2}{36}$ | $\frac{2}{36}$ | $\frac{1}{36}$ |
| $\frac{1}{36}$ | $\frac{2}{36}$ | $\frac{4}{36}$ | $\frac{2}{36}$ | $\frac{1}{36}$ |
| $\frac{1}{36}$ | $\frac{2}{36}$ | $\frac{2}{36}$ | $\frac{2}{36}$ | $\frac{1}{36}$ |
| $\frac{1}{36}$ | $\frac{1}{36}$ | $\frac{1}{36}$ | $\frac{1}{36}$ | $\frac{1}{36}$ |

| $-\frac{1}{8}$ | $-\frac{1}{8}$ | $-\frac{1}{8}$ | $-\frac{1}{8}$ | $-\frac{1}{8}$ |
|---|---|---|---|---|
| $-\frac{1}{8}$ | $-\frac{1}{4}$ | $-\frac{1}{4}$ | $-\frac{1}{4}$ | $-\frac{1}{8}$ |
| $-\frac{1}{8}$ | $-\frac{1}{4}$ | $5$ | $-\frac{1}{4}$ | $-\frac{1}{8}$ |
| $-\frac{1}{8}$ | $-\frac{1}{4}$ | $-\frac{1}{4}$ | $-\frac{1}{4}$ | $-\frac{1}{8}$ |
| $-\frac{1}{8}$ | $-\frac{1}{8}$ | $-\frac{1}{8}$ | $-\frac{1}{8}$ | $-\frac{1}{8}$ |

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

FIG. 11E

| ROM ADDS. | FILTER PARAMETERS |
|---|---|
| 00H | $\frac{1}{36}$ |
| | $\frac{1}{36}$ |
| | $\frac{1}{36}$ |
| | |
| | ⋮ |
| | $\frac{1}{36}$ |
| 20H | $-\frac{1}{8}$ |
| | $-\frac{1}{8}$ |
| | $-\frac{1}{8}$ |
| | $-\frac{1}{8}$ |
| | ⋮ |
| | $-\frac{1}{8}$ |
| 40H | 0 |
| | 0 |
| | 0 |
| | 0 |
| | ⋮ |
| | 0 |
| 60H | 0 |
| | 0 |
| | 0 |
| | ⋮ |

| 6 | 7 | 8 | 9 |
|---|---|---|---|
| 5 | 0 | 1 | 10 |
| 4 | 3 | 2 | 11 |
| 15 | 14 | 13 | 12 |

| 0 | 8 | 2 | 10 |
|---|---|---|---|
| 12 | 4 | 14 | 6 |
| 3 | 11 | 1 | 9 |
| 15 | 7 | 13 | 5 |

| 7 | 7 | 7 | 7 |
|---|---|---|---|
| 7 | 7 | 7 | 7 |
| 7 | 7 | 7 | 7 |
| 7 | 7 | 7 | 7 |

FIG. 12D

| | |
|---|---|
| 00H | 6 |
| | 7 |
| | 8 |
| | 9 |
| | ⋮ |
| | 12 |
| 10H | 0 |
| | 8 |
| | 2 |
| | 10 |
| | ⋮ |
| | 5 |
| 20H | 7 |
| | 7 |
| | 7 |
| | 7 |
| | ⋮ |
| | 7 |

F I G. 14

| MAX VALUE | FC1 / FB1 | FC0 / FB0 | DC1 / DB1 | DC0 / DB0 |
|---|---|---|---|---|
| 111 OUTPUT | 1 / 1 | 1 / 1 | 0 / 0 | 0 / 0 |
| 112 OUTPUT | 0 / 0 | 0 / 0 | 0 / 0 | 0 / 0 |
| 113 OUTPUT | 0 / 0 | 1 / 1 | 0 / 0 | 1 / 1 |
| 114 OUTPUT | 1 / 0 | 0 / 1 | x / 0 | x / 1 |
| 115 OUTPUT | 1 / 1 | 0 / 0 | x / x | x / x |

FIG. 15

| FILTER PARAMER | DITHER PATTERN | SUITABLE AREA TYPE | FC1' OR FB1' | FC0' OR FB0' | DC1' OR DB1' | DC0' OR DB0' |
|---|---|---|---|---|---|---|
| F4 | D1 | PHOTOGRAPHS | 1 | 1 | 0 | 0 |
| F1 | D1 | DOTS | 0 | 0 | 0 | 0 |
| F2 | D2 | CHARACTERS, LINES | 0 | 1 | 0 | 1 |
| F3 | X | Y,M,C FOR BLACK CHARACTER,PLANE | 1 | 0 | X | X |
| F2 | D3 | CHARACTERS | 0 | 1 | 1 | 0 |

| CODES<br>OUTPUT<br>CONTENTS | FC1 | FC0 | DC1 | DC0 |
|---|---|---|---|---|
| PHOTO DETECT | 1 | 1 | 0 | 0 |
| DOT DETECT | 0 | 0 | 0 | 0 |
| CHARACTER DETECT | 0 | 1 | 0 | 1 |
| PLANE DETECT | 1 | 0 | X | X |

FIG. 19A

| CODES | | CONTENTS |
|---|---|---|
| FC1 (FB1) | FC0 (FB0) | FILTER |
| 0 | 0 | SMOOTHING (F1) |
| 0 | 1 | EDGE EMPHASIZING (F2) |
| 1 | 0 | ALL-ZERO-OUTPUT (F3) |
| 1 | 1 | THROUGH (F4) |

FIG. 19B

| CODES | | CONTENTS |
|---|---|---|
| DC1 (DB1) | DC0 (DB0) | DITHER |
| 0 | 0 | DOT CONCENTRATION (D1) |
| 0 | 1 | DOT SCATTERING (D2) |
| 1 | 0 | BINARIZATION (D3) |

DIGITAL IMAGE PROCESSING APPARATUS

BACKGROUND OF THE INVENTION

The present invention generally relates to a digital image processing apparatus, and in particular, to a digital image processing suitable for halftone image representation based on the tone production method in which tone or gradation is represented by changing the ratio of recording dots to non-recording dots in unit area. The present invention is suitably applied to a digital color copier, a facsimile machine and the like.

A digital image processing apparatus is designed to process image data in digital form. For example, it is known to represent digital image data by the dot matrix method. In the dot matrix method, each dot is represented with only a few tone (gradation) levels. However, in order to record high-quality image relating to photographs or pictures on a recording medium such as paper and a print plate, a dot should be represented with 64 tone levels for each of the basic colors such as yellow (Y), Magenta (M), cyanogen (C), and black (Bk).

In order to make possible the above-mentioned multilevel image representation, a proposal is known where a dot area which has a fixed area and is composed of a plurality of dots, is defined as a unit area for the tone production process, and the tone representation is made by changing the number of recording dots and the number of non-recording dots contained in the unit area. Those examples of this type are a tone production method by density pattern, and a dither method.

However, the conventional multilevel image representation has a disadvantage in that as the number of tone levels increases, the resolution is deteriorated An increase of the number of tone levels is suitable for images of photographs, and on the other hand, is unsuitable for character images and line images, which are desired to reproduce images with high resolution. Therefore, it is preferable to represent character and line images by using a bi-level signal.

In the conventional dither method, it is known to use different dither matrix patterns based on which one of the tone representation and resolution should be mainly considered. When great importance is attached to the number of tone levels (tone representation), a dot concentration pattern (spiral type) is used. On the other hand, when great importance is attached to the resolution, a dot scattering pattern (Bayer type) is employed. The dot concentration pattern is of a relatively large matrix size, and the dot scattering pattern is of a relatively small matrix size.

An improved image processing has been proposed based on the above-mentioned dither method. In the proposed image processing, two halftone image processing modes are used. The optimum processing mode is selected from the two image processing modes, depending on the type of a document to be processed. For example, when a multicolored document such as photographs is processed, a dot concentration pattern is selected to effectively reproduce each color. When a document having dot images is processed, a smoothing process is carried out prior to the dither process in order to prevent the occurrence of moire. When a document having character images or line images is handled, an edge emphasizing process is performed, which is followed by the dither process where the dot scattering pattern is selected.

In order to apply the above-mentioned improved image processing to a mixed document having photographs, characters, dot images and line images, for example, it is necessary to extract features of an area of concern on the document and select the image processing most suitable for the extracted features of the area. Some proposals for identifying the type of document are known For example, it is known to automatically extract edges of characters or lines and select one of two halftone image processing modes based on the results of the edge detection (see Japanese Laid-Open Patent Application Nos. 62-186663, 62-186664, and 62-186665). In the proposal, when an edge is detected, an image processing mode is selected which provides high resolution. On the other hand, when no edge is detected, an image processing mode is selected which provides high gradation.

However, it is very difficult to reproduce a high-quality image by simply detecting the presence of edges of characters or lines. In other words, it is very difficult to represent various features of areas on an document to be scanned by simply detecting the presence of edges of characters or lines.

SUMMARY OF THE INVENTION

It is therefore a general object of the present invention to provide a novel and useful digital image processing apparatus in which the above-mentioned disadvantages are eliminated.

A more specific object of the present invention is to provide a digital image processing apparatus in which an increased number of features of areas on a document is extracted, and the optimum image processing mode is selected from among predetermined image processing modes on the basis of the detected features, thereby providing higher-quality images The above objects of the present invention can be achieved by a digital image processing apparatus which includes first and sixth circuits. The first circuit divides digital input image data into a plurality of blocks, each block defining an area of a predetermined size. The second circuit detects a plurality of features of the divided digital image data for every pixel. The third circuit calculates, for every block, a quantity of each of the detected features supplied from the second circuit. The fourth circuit determines, for every block, the type of area of concern from the calculated quantity of each of the detected features supplied from the third circuit. The fifth circuit processes the digital image data in any one of a plurality of image processing modes, thereby producing output digital image data. The sixth circuit selects the most suitable image processing mode among the plurality of image processing modes on the basis of the determined type of the area supplied from the fourth circuit.

Other objects, features and advantages of the present invention will become apparent from the following detailed description when read in conjunction with the accompanying drawings.

BRIEF DESCRIPTION OF THE DRAWINGS

FIG. 1 is a schematic block diagram of a first embodiment of the present invention;

FIG. 4B through 4E are views illustrating examples of dot patterns;

FIG. 4F is a view illustrating the correspondence between the matrix of FIG. 2A and dot patterns of FIGS. 4B through 4E;

FIG. 8A is a timing chart illustrating timing signals generated by a timing signal generator;

FIG. 8B is a block diagram of the timing signal generator which generates timing signals shown in FIG. 8A;

FIG. 11A through 11D are views illustrating examples of filter parameters;

FIG. 11E is a view illustrating ROM addresses relating to filter parameters;

FIGS. 12A through 12C are views illustrating example of dither patterns;

FIG. 12D is a view illustrating ROM addresses relating to the dither pattern;

FIG. 14 is a view illustrating codes which are output from a programmable logic array built in the decision making and control circuit of the first embodiment;

FIG. 15 is a view for explaining combinations of outputs of an FIFO memory built in the decision making and control circuit of FIG. 13 and image processing modes;

FIGS. 19A and 19B are views showing image processing codes and the content of image processing modes selected thereby.

DESCRIPTION OF THE PREFERRED EMBODIMENTS

Figure 2A:
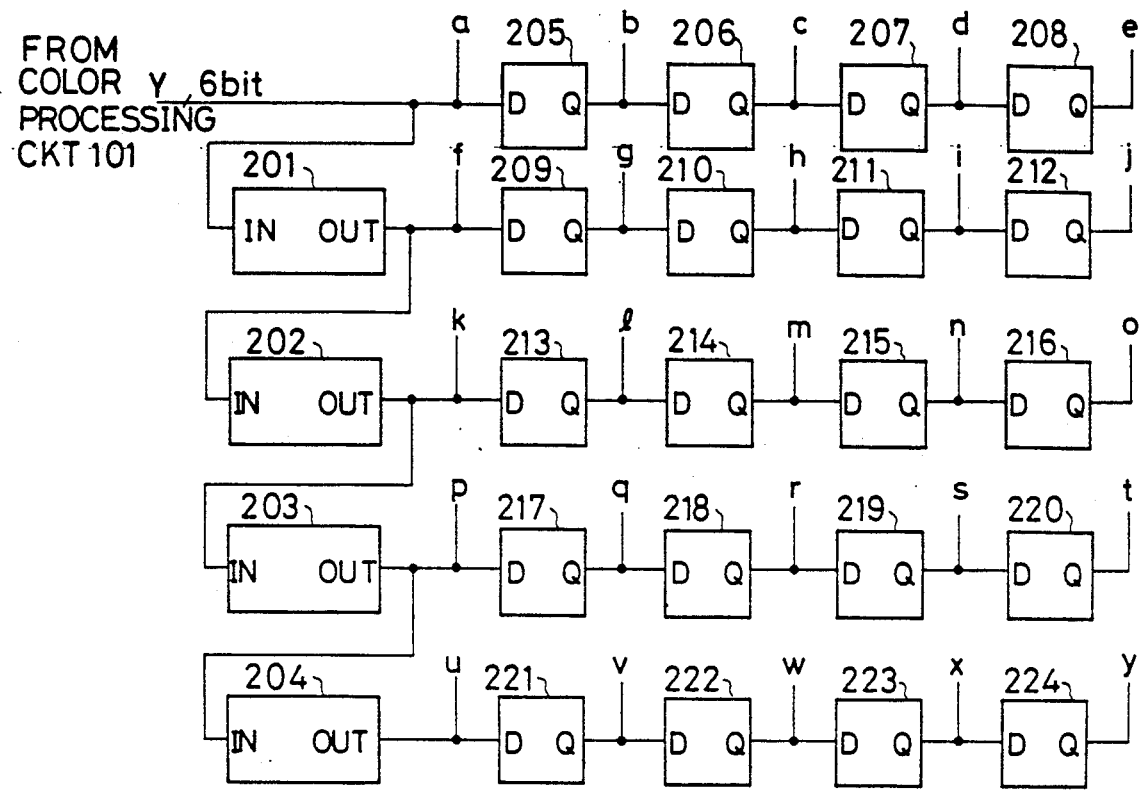
FIG. 2A is a circuit diagram of a matrix circuit.

A description is given of a preferred embodiment of the present invention.

FIG. 1 schematically shows the structure of an image processing apparatus provided by a first embodiment of the present invention. Referring to FIG. 1, image data relating to red (R), green (G) and blue (B) are supplied from a document scanning unit (not shown) to first and second color processing circuits 101 and 102. The document scanning unit includes charge-coupled devices, and analog-to-digital converters. A matrix generating circuit 103 generates a matrix from output signals of the first color processing circuit 101. Output signals of the matrix generating circuit 103 are supplied to a level detection circuit 104, a dot detection circuit 105, an edge detection circuit 106, a black component detection circuit 107, and a level detection circuit 108, which are connected to counters 111, 112, 113, 114 and 115, respectively. A decision making and control circuit 116 receives output signals of the counters 111 to 115, and timing signals generated by a timing signal generator 110, which also generates timing signals to be supplied to the counters 111 to 115. A line memory 109 functions to delay image signals supplied from the second color processing circuit 102. A filter circuit 117 is supplied with a delayed image signals supplied from the line memory 109 and a control signal supplied from the decision making and control circuit 116. A gradation processing dither circuit 118 carries out a gradation process for delayed image signals supplied from the filter circuit 117 in accordance with a control signal supplied from the decision making and control circuit 116.

The first and second color processing circuits 101 receives 8-bit input image data of red (R), green (G) and blue (B). The first color processing circuit 101 generates image data relating to yellow (Y), Magenta (M), and cyanogen (C). The second color processing circuit 102 generates, in addition to the above-mentioned colors, image data relating to black (Bk). Each of the first and second image processing circuits 101 and 102 is made up of a gamma ($\gamma$) correction circuit for adjusting gradation, and a complementary color generating circuit which converts red, green and blue into cyanogen, Magenta and yellow, a masking circuit and an under-color removal circuit which generates black (Bk). The image data generated by the under-color removal circuit in the first image processing circuit 101 is not output. Each of the first and second color processing circuits 101 and 102 may be constructed by a color processing circuit disclosed in Japanese Laid-Open Patent Application No. 62-186663, for example.

The first color processing circuit 101 performs a color processing for the detection circuits 104, 105, 106, 107 and 108, which are used to detect various features of each pixel. Although the color processing circuit 101 is not designed to generate black (Bk), the color processing circuit 101 adjusts the gray balance so as to generate almost the same output level for yellow (Y), Magenta (M) and cyanogen (C) with respect to input image data relating to black and gray. The image data for each color consists of 6 bits.

The second color processing circuit 102 is positioned in a system relating to image data which are actually output to an external circuit (not shown) from the dither circuit 118. The input image data are subjected to the gamma correction by the gamma correction circuit. Thereafter, the gamma-corrected image data are subjected to the UCR (under-color removal) process and masking process which are in conformity with characteristics of the external circuit such as a printer. Finally, the second color processing circuit 102 generates 6-bit image data relating to each of yellow (Y), Magenta (M), cyanogen (C) and black (Bk) from the 8-bit input image data relating to each of red (R), green (G) and blue (B).

The matrix generating circuit 103 is a circuit which latches image data in the vicinity of the image data being processed. For this purpose, the image data from the first color processing circuit 101 is divided into blocks each having a predetermined number of bits. Then, a 5×5 matrix where each matrix element consists of 6 bits, is generated for every block.

Figure 2B:
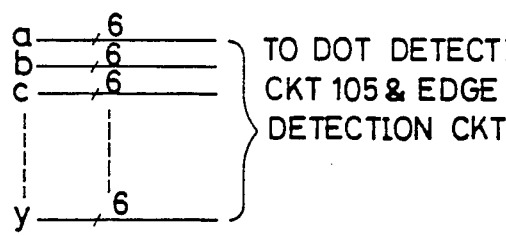
FIGS. 2B and 2C are views illustrating states of outputs of the matrix circuit of FIG. 2A.
Figure 2C:
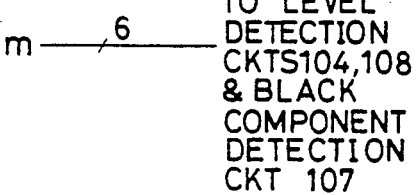

An example of the matrix generating circuit 103 is illustrated in FIG. 2A. The illustrated example relates to a portion of the matrix generating circuit 103 with respect to yellow (Y). As illustrated, the circuit includes latch elements 205 through 224 used to latch image data in a main scanning direction, and line memories 201 to 204 which function as the first-in first-out (FIFO) operation and latch image data in a sub-scanning direction. The level detection circuits 104 and 108 and the black component detection circuit 107 do not require matrix data in order to extract corresponding features of an area (block). The detection circuits 104, 107 and 108 are supplied with data positioned at the center of the matrix generated by the matrix generating circuit 103 in order to avoid the occurrence of positional error on the time axis between detection data derived therefrom and detection data derived from the dot detection circuit 105 and the edge detection circuit 106 which use matrix data. That is, as shown in FIG. 2B, the dot detection circuit 105 and the edge detection circuit 106 are supplied with 6-bit data obtained at each of the points 'a' through 'y' of the matrix. On the other hand, the level detection circuits 104 and 108 and the black component detection circuit 107 are supplied with 6-bit data obtained at point 'm' positioned at the center of the matrix, as shown in FIG. 2C. Matrix generating circuits with respect to Magenta (M) and cyanogen (C) are constructed by circuits each identical to the circuit of FIG. 2A.

The level detection circuit 104, the dot detection circuit 105, the edge detection circuit 106, the black component detection circuit 107 and the level detection circuit 108 output respective detection results for every pixel. As will be described in detail later, the detection circuits 104 to 108 cooperate with the counters 111 to 115, respectively, in order to detect features for every block (area). Each of the detection circuits 104 to 108 generates a 1-bit detection data, which has a value of "1" of an active level when a corresponding detection condition is satisfied, and which has a value of "0" of an inactive level when it is not satisfied.

Figure 3:
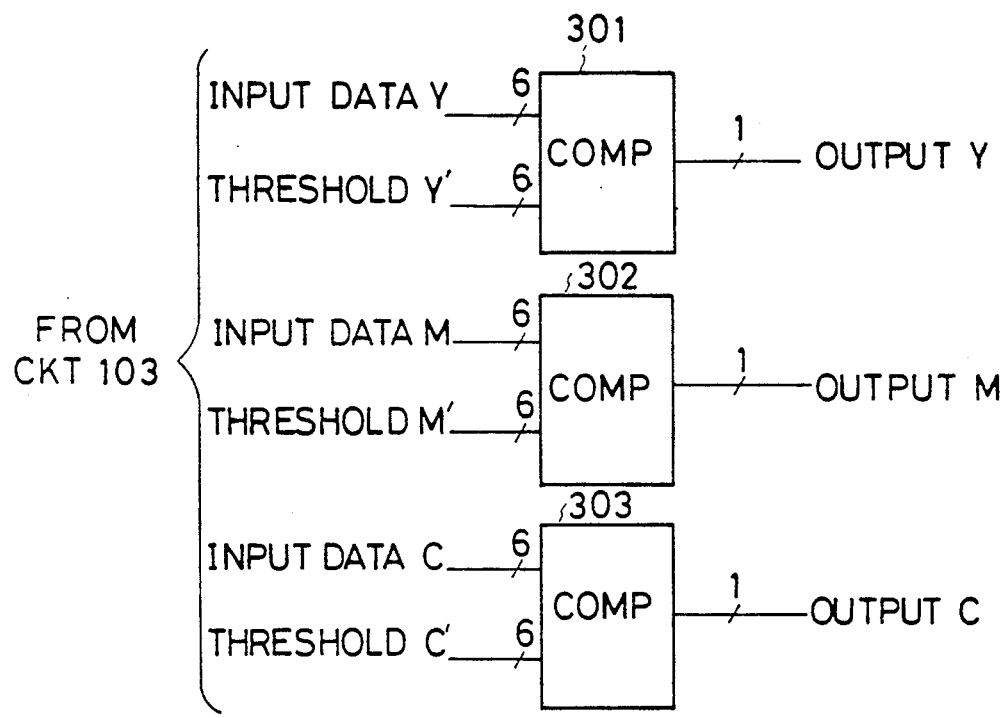
FIG. 3 is a view illustrating an example of a level detection circuit for colored pixels.

The level detection circuit 104 functions to detect colored pixels. As shown in FIG. 3, the level detection circuit 104 includes comparators 301, 302 and 303 for colors of yellow (Y), Magenta (M) and cyanogen (C), respectively. The comparators 301, 302 and 303 are supplied with corresponding fixed threshold values Y', M' and C'. Each comparator outputs "1" when the input data supplied thereto represents a value equal to or larger than the corresponding threshold value, and outputs "0" when the input data is smaller than the corresponding threshold value.

Figure 4A:
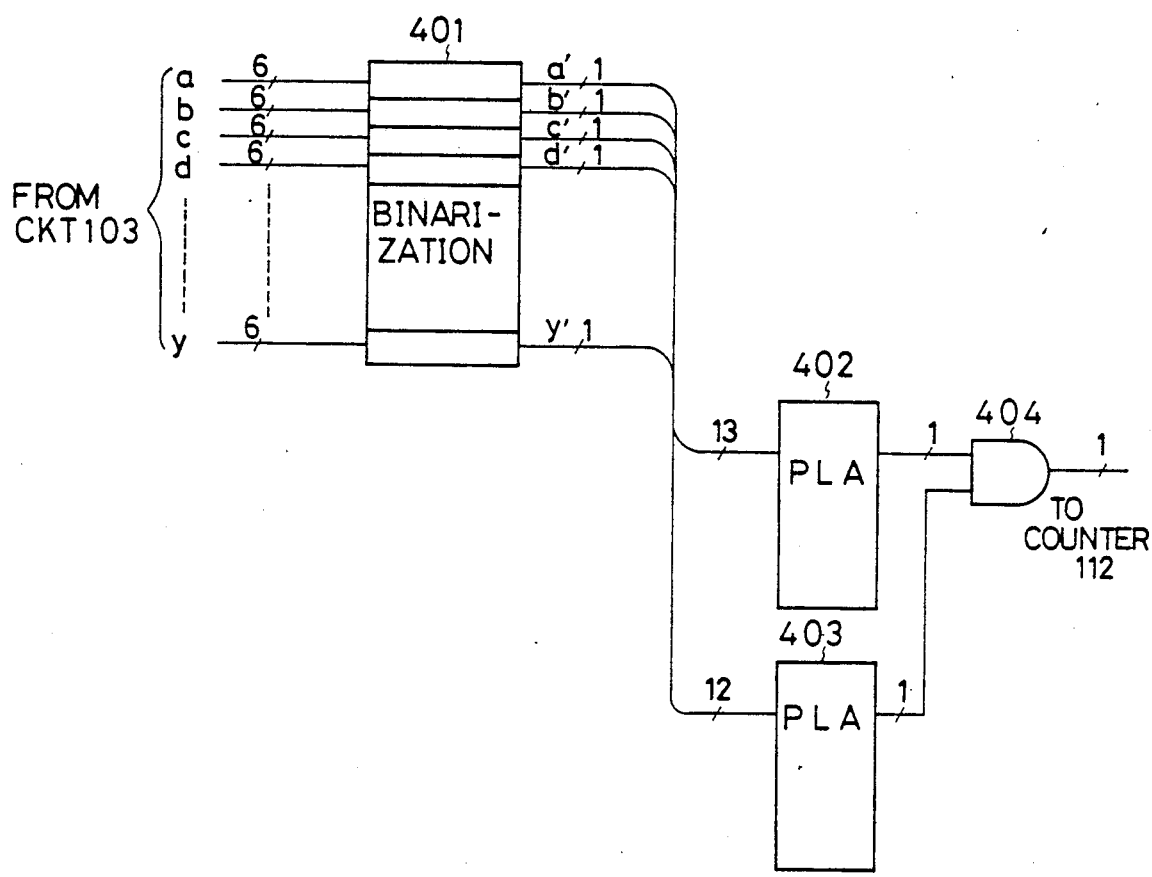
FIG. 4A is a block diagram of a dot detection circuit.

The dot detection circuit 105 converts the data latched in the matrix generating circuit 103 into binary-valued data, and compares the latched data with a predetermined dot pattern. FIG. 4A shows an example of the structure for the dot detection circuit 105. The illustrated structure is provided for each color and is designed to detect a 5×5 dot pattern. The dot detection circuit 105 of FIG. 4A is composed of a binarization circuit 401, two programmable logic array circuits 402 and 403 (hereafter simply referred to as PLA circuits), and an AND gate 404. The binarization circuit 401 is supplied with the image data a through y each consisting of 6 bits, and generates corresponding 1-bit data a' through y'. The PLA circuits 402 and 403 perform pattern matching between the dot pattern made up of the data a' through y' and a plurality of reference dot patterns created in the PLA circuits 402 and 403. When the pattern matching is successful, the PLA circuits 401 and 402 produce "1" represented by one bit, and produce "0" in other cases The AND gate 404 produces "1" when both the PLA circuits 402 and 403 produce "1", which is supplied to the counter 112.

FIGS. 4B through 4F illustrate examples of the dot pattern in which "0" and "1" represent matching data, and "x" represents "don't care". For example, the PLA circuits 402 and 403 create the dot pattern of FIG. 4B by using the following formulas, which are obtained from the correspondence between the dot pattern of FIG. 4B and the input data a' through y':

PLA circuit 402 $g' \times \overline{h}' \times \overline{i}' \times \overline{l}' \times m'$ PLA circuit 403 $n' \times \overline{q}' \times \overline{r}' \times \overline{s}'$ where the input data to be supplied to the PLA circuit 402 are represented by a, through m', and the input data to be supplied to the PLA circuit 403 are represented by n' through y'.

Figures 5A, 5B, 5C:
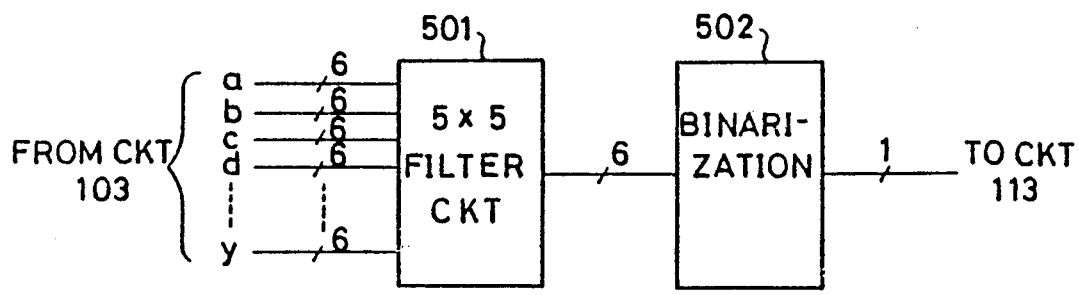
FIG. 5A is a block diagram of an edge detection circuit.
FIGS. 5B and 5C are views illustrating examples of edge extraction parameters.

The edge detection circuit 106 subjects the data latched by the matrix generating circuit 103 to a filtering operation by a 5×5 filter circuit 501 shown in FIG. 5A. A 6-bit output signal of the 5×5 filter circuit 501 is converted into a binary-valued signal through a binarization circuit 502. When an edge is detected, the binarization circuit 502 produces a binary value of "1". In other cases, the binarization circuit 502 produces a binary value of "0". In the filter circuit 501, there is set filter parameters for use in edge detection as shown in FIGS. 5B and 5C.

Figure 6:
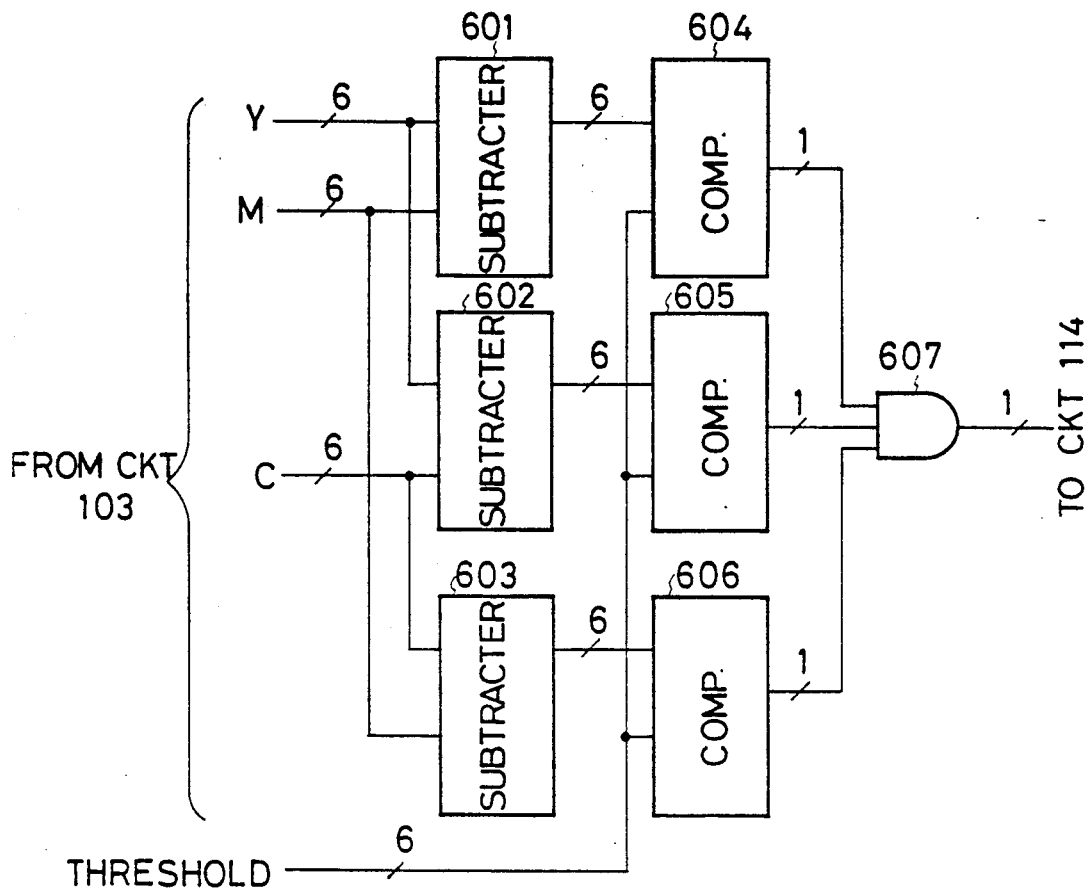
FIG. 6 is a block diagram of a black component detection circuit.

Referring to FIG. 6, the black component detection circuit 107 is made up of three subtracters 601, 602 and 603, three comparators 604, 605 and 606, and an AND gate 607. The subtracter 601 calculates the difference between values of data relating to yellow (Y) and Magenta (M). The subtracter 602 calculates the difference between values of data relating to yellow (Y) and cyanogen (C). The subtracter 603 calculates the difference between values of data relating to Magenta (M) and cyanogen (C). The differences supplied from the subtracters 601, 602 and 603 are supplied to the comparators 604, 605 and 606, respectively. When the differences calculated by the subtracters 601, 602 and 603 are equal to or smaller than a fixed threshold value, the corresponding comparators 604, 605 and 606 generate binary values of "1", and generate binary values of "0" in other cases. The comparison results are supplied to the AND gate 607, which produces a binary value of "1" only when all the comparison results are equal to "1".

Figure 7:
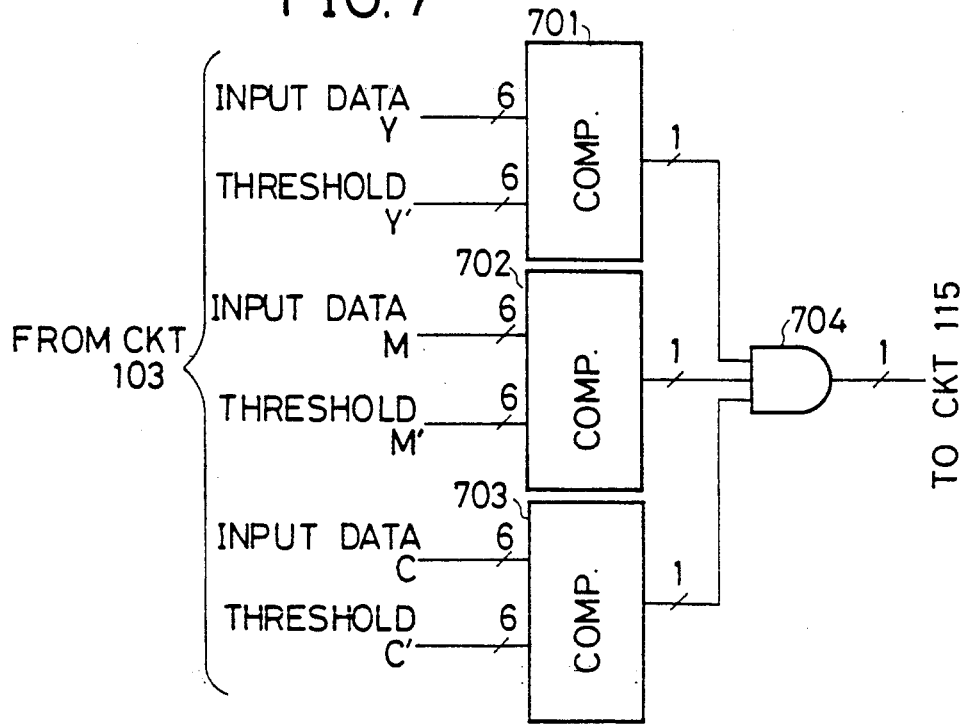
FIG. 7 is a block diagram of a level detection circuit used for detecting a level of a plane (background) portion of a document being processed.

As shown in FIG. 7, the level detection circuit 108 is composed of comparators 701, 702 and 703, and an AND gate 704. The comparators 701, 702 and 703 compare the data relating to yellow (Y), Magenta (M) and cyanogen (C) with fixed threshold the timing signal generator 110 is made up of frequency-division counters 801 and 802, AND gates 803 and 804, and an OR gate 805. The frequency-division counter 801 is supplied with the pixel clock A, which produces timing signals B and C having frequencies as large as a half of the frequency of the pixel clock A and a quarter thereof, respectively. The AND gate 803 receives the signals A, B and C, and generates the timing signal D. The frequency-division counter 802 generates timing signals F and G having frequencies as large as a half of the frequency of the line synchronization signal E and a quarter thereof, respectively. The AND gate 804 generates the timing signal H from the signals E, F and G. The AND gate 805, which has inverters at input and output terminals thereof, performs the OR operation on the timing signals F and G, and generates the timing signal I. As shown in FIG. 8A, the timing signal D is generated for every four pixels in the main scanning direction, and is supplied to the counters 111 to 115 and the decision making and control circuit 116. The timing signal H is generated for every four sub-scanning lines, and is supplied to the counters 111 to 115 and the decision making and control circuit 116. The timing signal I is used to initialize the counters 111 to 114 when a value amounting to one block (4×4 pixel arrangement) is counted.

Figure 9:
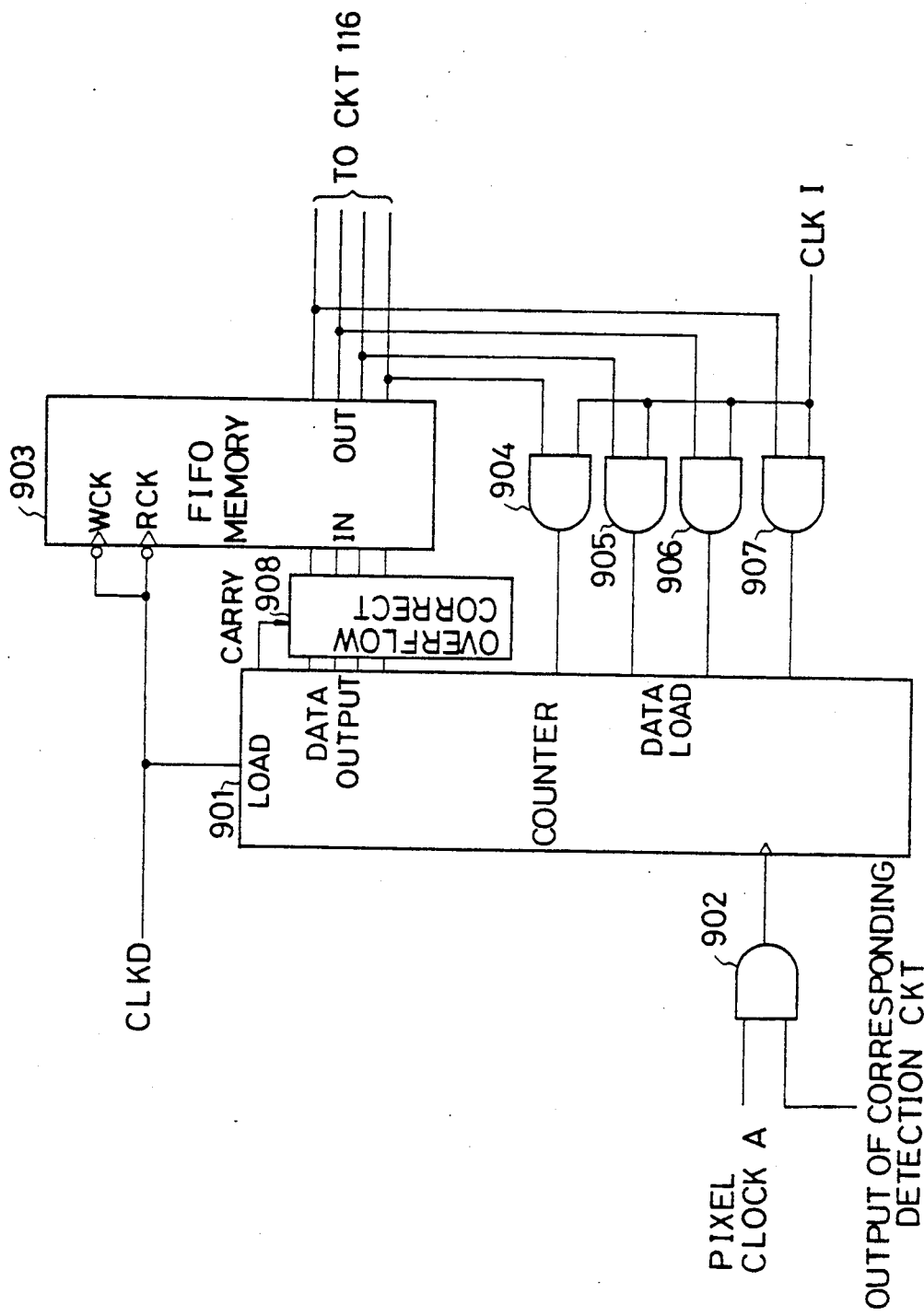
FIG. 9 is a block diagram of a counter.

Each of the counters 111, 112 and 113 includes three counters provided for corresponding colors Y, M and C. Each counter included in each of the counters 111, 112 and 113 is illustrated in FIG. 9. The illustrated structure can be applied to each of the counters 114 and 115. Referring to FIG. 9, an AND gate 902 is supplied with the pixel clock A and the output signal of the corresponding one of the detection circuits 104 through 108. An output signal of the AND gate 902 is supplied to a counter 901, which increments by 1 when the corresponding detection result indicates "1". In synchronization with the timing signal D supplied from the AND gate 803 shown in FIG. 8B, the counter 901 writes the count value into a first-in first-out memory (hereafter simply referred to as an FIFO memory) 903 for every four pixels arranged in the main scanning direction. At this time, if the count value becomes equal to 16 and exceeds four bits, the count value is corrected to 4 bit data (15) by an overflow correction circuit 908. At the same time as the count value is written into the FIFO memory 903, the count value relating to the next block positioned at the line preceding the current line by one line, is read out from the FIFO memory 903. The read-out count value is loaded into the counter 901 through AND gates 904. During the loading operation, the timing signal I supplied to the AND gates 904 through 907 is kept at a high level. Then the counter 901 counts as in the case of the counting for the preceding block. Values of "0" are loaded into the counter 901 through the AND gates 904 to 907 for every four lines, thereby initializing the counter 901. Therefore, the counter 901 counts the results of the corresponding document detection for every block. As described previously, the structure of FIG. 9 is provided for each color in each of the counters 111, 112 and 113, and the largest count value which indicates the detection result for each block, is output from each of the counters 111, 112 and 113.

Figure 10:
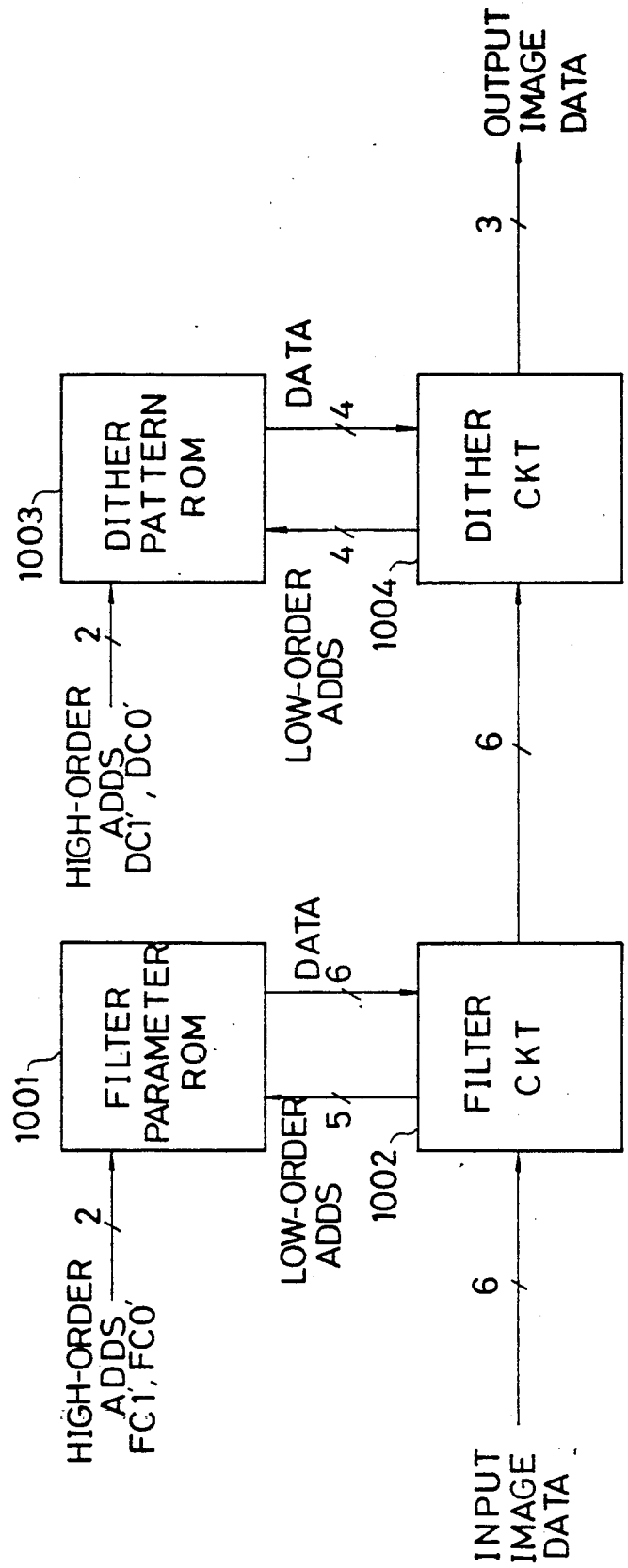
FIG. 10 is a block diagram showing an example of an image processing circuit, which is controlled by a decision making and control circuit.

The detection results supplied from the counters 111 through 115 are fed to the decision making and control circuit 116. The structure for the decision making and control circuit 116 is based on the structure for the image processing circuit. In the present embodiment, the image processing circuit is made up of the filter circuit 117 and the dither circuit 118 for the gradation process. FIG. 10 shows an example of the image processing circuit which is provided for each color.

Referring to FIG. 10, the 6-bit image data relating to one of the colors is supplied to a filter circuit 1002, which subjects the input image data to the 5×5 matrix operation in the same way as the aforementioned filter circuit used in the edge detection circuit 106. The filter parameters used in the filter circuit 1002 are stored in a filter parameter read only memory (hereafter simply referred to as filter parameter ROM) 1001, and are read out therefrom and loaded into the filter circuit 1002 when the filtering operation is carried out. The filter parameter ROM 1001 stores different filter parameters, and desired filter parameters can be read out therefrom by altering high-order addresses FC1' and FC0' to be supplied from the decision making and control circuit 116 to the filter parameter ROM 1001. Low-order addresses are supplied from a counter (not shown) built in the filter circuit 1002 to the filter parameter ROM 1001. The change of the filter parameters leads to a switch of image processing modes, which are defined by the combination of the filter parameters and dither patterns, as described below.

By changing the filter parameters, it is possible to have the filter circuit 1002 perform a smoothing process F1 suitable for dot pattern images, an edge emphasizing process F2 suitable for characters and line images, a process F3 suitable for a plane (background) portion of document in which a data value of "0" is always output, and a process F4 in which no filter is applied to the input data, and the like. Examples of the filter parameters are illustrated in FIGS. 11A through 11D, which are concerned with the processes F1 through F4, respectively. The filter parameters are stored in the filter parameter ROM 1001 as shown in FIG. 11E. For example, the filter parameters starting with an ROM address of 00H are used for the smoothing process F1, and the filter parameters starting with an ROM address of 20H are used for the edge emphasizing process F2. It is noted that two (or more) high-order bits contained in '00H' (H means Hexa), for example, are used as the high-order address.

Turning to FIG. 10, the dither circuit 1004 for gradation process is constituted in the same way as the filter circuit 1002. A dither pattern ROM 1003 stores various dither patterns such as a dot concentration pattern D1, a dot scattering pattern (Bayer pattern) D, a binarization pattern D3, and the like. Desired one of those dither patterns can be read out from the dither pattern ROM 1003 by changing high-order addresses supplied from the decision making and control circuit 116 thereto. Low-order addresses are supplied from a counter (not shown) built in the dither circuit 1004 to the dither pattern ROM 1003.

Figure 12D:
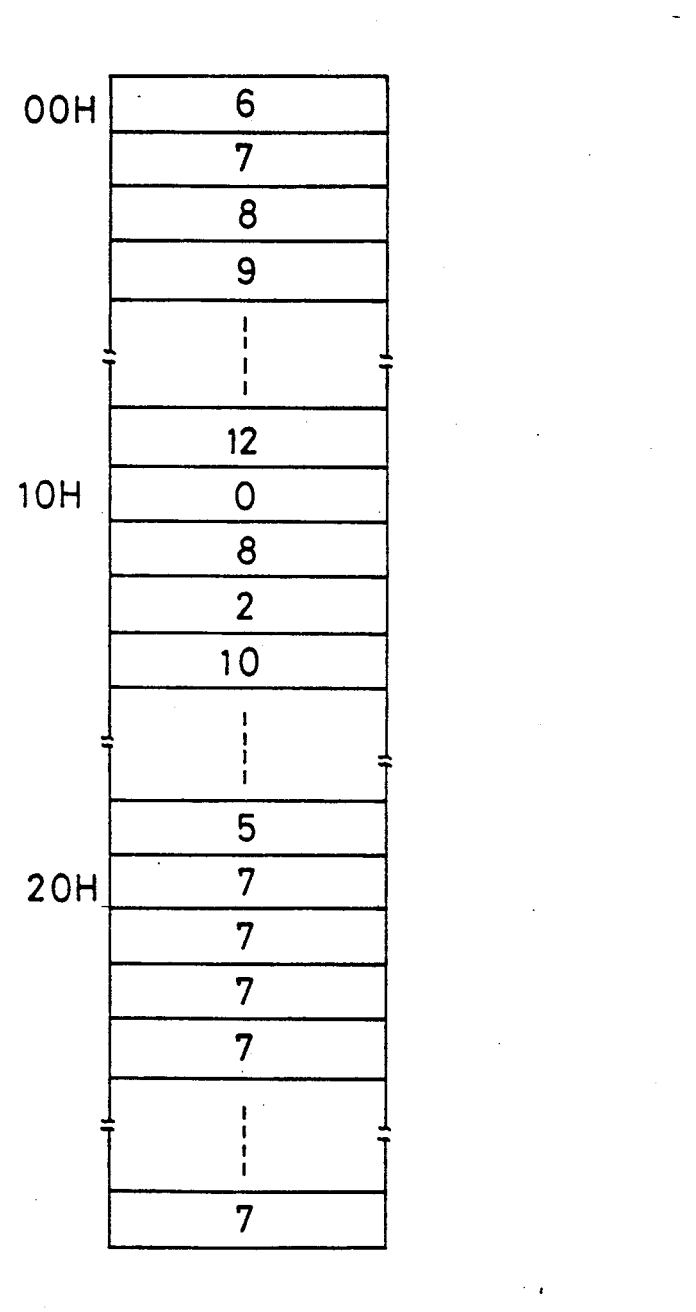

Examples of the dither patterns are illustrated in FIG. 12A through 12C. FIG. 12A shows an example of the dot concentration pattern D1, FIG. 12B shows an example of the dot scattering pattern D2, and FIG. 12C shows an example of the binarization pattern D3. The dither patterns D1, D2 and D3 are stored as shown in FIG. 12D. For example, an ROM address of 00H is the start address with respect to the dot concentration pattern D1, and an ROM address of 10H is the start address with respect to the dot scattering pattern D2.

The decision making and control circuit 116 determines the type of areas for every block, and controls the image processing circuit consisting of the filter circuit 117 and the dither circuit 118 on the basis of the decision result. In other words, responsive to the decision result, the optimum image processing is selected based on the area type.

Figure 13:
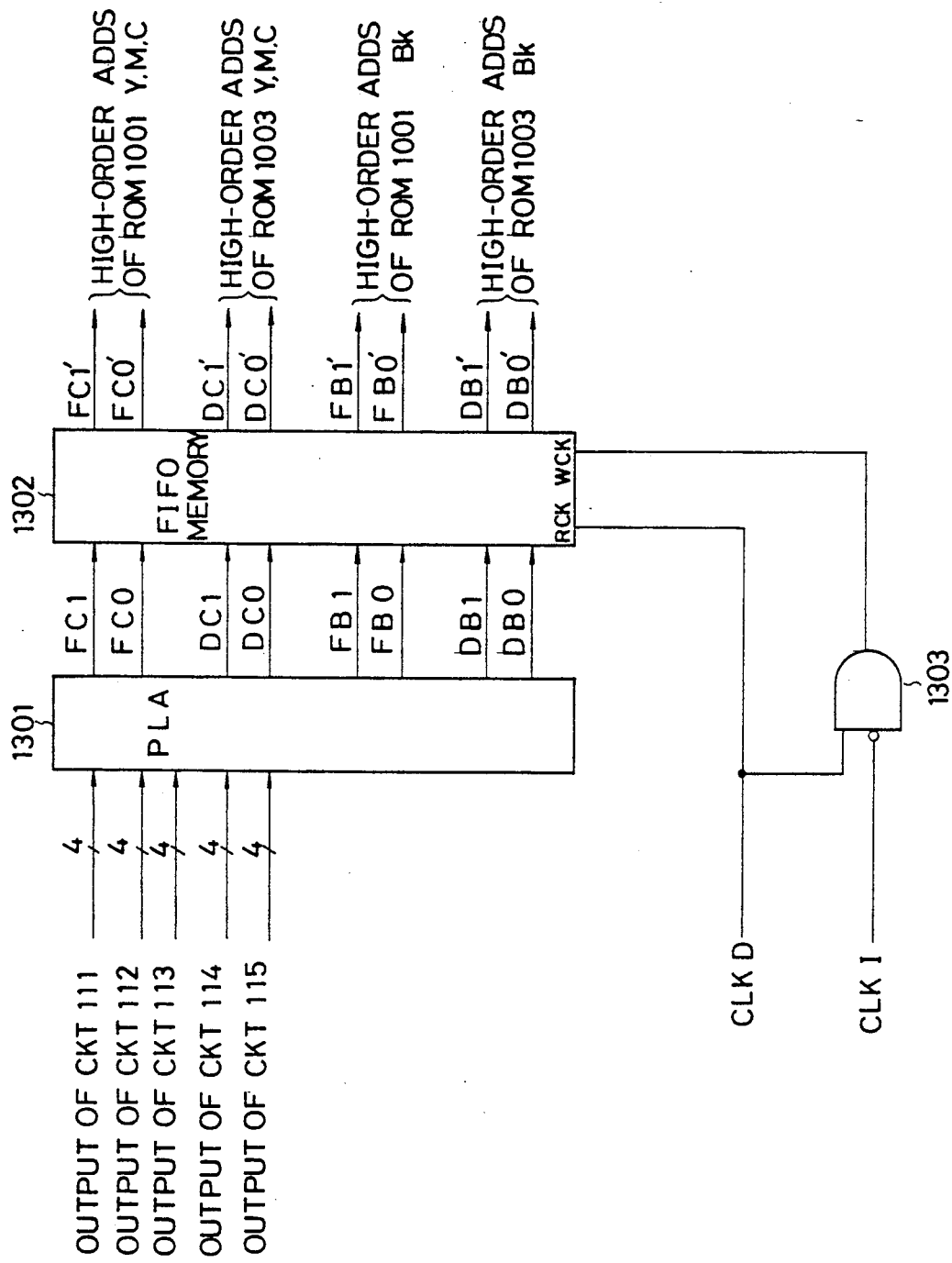
FIG. 13 is a block diagram of a decision making and control circuit used in a first embodiment of the present invention.

An example of the decision making and control circuit 116 is illustrated in FIG. 13. The illustrated decision making and control circuit 116 is primarily made up of a PLA circuit 1301 and an FIFO memory 1302. The PLA circuit 1301 compares the count values supplied from the counters 111 to 115, and produces codes based on the relationship in magnitude among those count values, as defined in FIG. 14. The codes derived from the PLA circuit 1301 are supplied to the FIFO memory 1302, and are written therein for every block of the 4×4 pixel arrangement. The following control signals are read out from the FIFO memory 1302 for every four pixels. The control signals or codes FC1' and FC0', which indicate the high-order addresses, are supplied to the filter parameter ROMs 1001 provided for colors of yellow (Y), Magenta (M) and cyanogen (C). Control signals FB1' and FB0' are supplied, as the high-order addresses, to the filter parameter ROM for black (Bk). The control signals DC1' and DC0' are supplied, as the high-order addresses, to the dither pattern ROMs 1003 for colors of yellow (Y), Magenta (M) and cyanogen (C). Control signals DB1' and DB0' are supplied, as the high-order addresses, to the dither pattern ROM for black (Bk). The gate 1303 is supplied with the timing signal D, and the timing signal through an inverter connected to an input terminal thereof. An output signal of the gate 1303 is supplied to a write clock input terminal WCK of the FIFO memory 1302. A read clock input terminal RCK of the FIFO memory 1302 is supplied directly to the timing signal D.

FIG. 15 shows combinations of values of the control signals derived from the FIFO memory 1302, and the image processing modes selected on the basis of values of the control signals. Referring to FIG. 15, when FC1' or FB1' is "1", FC0' or FB0' is "1", DC1' or DB1' is "0", and DC0' or DB0' is "0", the filter parameter relating to the process F4 in which no filter is applied to the image data, and simultaneously the dot concentration dither pattern D1 is selected. This combination is suitable for photographs. When FC1' or FB1' is "0", FC0' or FB0' is "0", DC1' or DB1' is "0", and DC0' or DB0' is "0", the filter parameter relating to the smoothing process F1, and the dot concentration dither pattern D1 are selected. This combination is suitable for dot images. When FC1' or FB1' is "0", FC0' or FB0' is "1", DC1' or DB1' is "0", and DC0' or DB0' is "1", the filter parameter relating to the edge emphasizing process F2, and the dot scattering pattern D2 are selected. This combination is suitable for character images or line images. When FC1' or FB1' is "1", FC0' or FB0' is "0", and the remaining control signals are "don't care", the filter parameter relating to the process F3 in which a value of "0" is always produced. In this case, any one of the dither patterns may be used. This combination is suitable for yellow (Y), Magenta (M) and cyanogen (C) of black characters and backgrounds of a document. When FC1' or FB1' is "0", FC0' or FB0' is "1", DC1' or DB1' is "1", and DC0' or DB0' is "0", the filter parameter relating to the edge emphasizing process F2, and the binarization pattern D3 are selected. This combination is suitable for character images.

Turning to FIG. 1, the line memory 109 delays the image data derived from the the color processing circuit 102 by a time taken to obtain the decision result, and thereby synchronizes the image data with the control signals (codes) supplied from the decision making and control circuit 116. The line memory 109 can be formed by a memory circuit which presents the FIFO operation.

For example, when the count values of the counters 111, 112, 113, 114 and 115 are 5, 12, 9, 3 and 1, respectively, the PLA circuit 1301 shown in FIG. 13 determines that the count value of the counter 112 relating to the dot detection is the largest Therefore, the image data amounting to one block (area) being processed is estimated to be a dot pattern. Then the decision making and control circuit 116 supplies the filter circuit 117 and the dither circuit 118 with the corresponding control signals so as to select the filter parameter F1 shown in FIG. 11A and the dither pattern D1 shown in FIG. 12A. That is, the filter parameter F1 and the dither pattern D1 are read out from the filter parameter ROM 1001 and the dither pattern ROM 1003, respectively. The image data relating to each of the colors passes through the filter circuit 1002 and the dither circuit 1004 shown in FIG. 10. Consequently, the output image data relating to yellow (Y), magenta (M), cyanogen (C) and black (Bk) are output from the dither circuit 118. The output image data generated for each color consists of 3 bits. The image data thus formed are supplied to laser diodes (not shown) through laser drivers (not shown), for example.

It is noted that the use of the detection circuits 104, 105, 106, 107 and 108 is intended to prevent erroneous decision making. It is particularly noted that according to the present embodiment, the optimum image processing mode can be selected by subjecting the detection results derived from the detection circuits 104 to 108 to the aforementioned signal processing. It should be noted that it is very difficult to determine the type of area with high accuracy by each detection circuit by itself.

Figure 16:
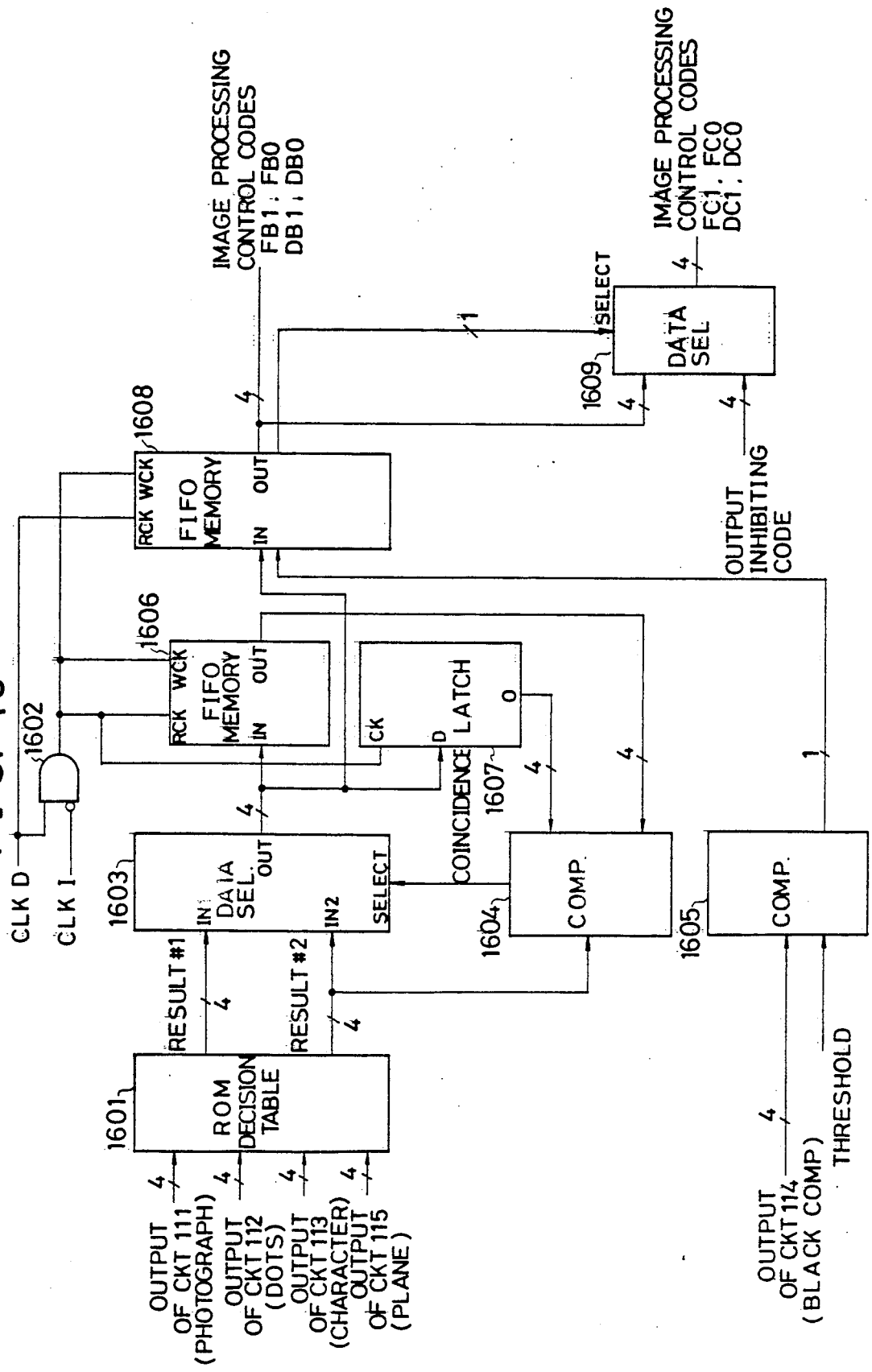
FIG. 16 is a decision making and control circuit used in a second embodiment of the present invention.

A description is given of a second embodiment of the present invention with reference to FIG. 16. The second embodiment is constructed by substituting the decision making and control circuit 116 with the structure shown in FIG. 16, and the other elements are the same as those shown in FIG. 1. Referring to FIG. 16, the decision making and control circuit 116 used in the second embodiment includes a read only memory (ROM) 1601, a data selector 1603, two FIFO memories 1606 and 1608, a latch circuit 1607, two comparators 1604 and 1605, a data selector 1609, and a gate 1602. The ROM 1601 stores a decision making table, which is accessed by the detection results supplied from the detection circuits 111, 112, 113, 114 and 115. The ROM 1601 outputs a 4-bit detection result indicating the largest count value as a decision result #1, and a 4-bit detection result indicating the second largest count value as a decision result #2.

Figures 17, 18:
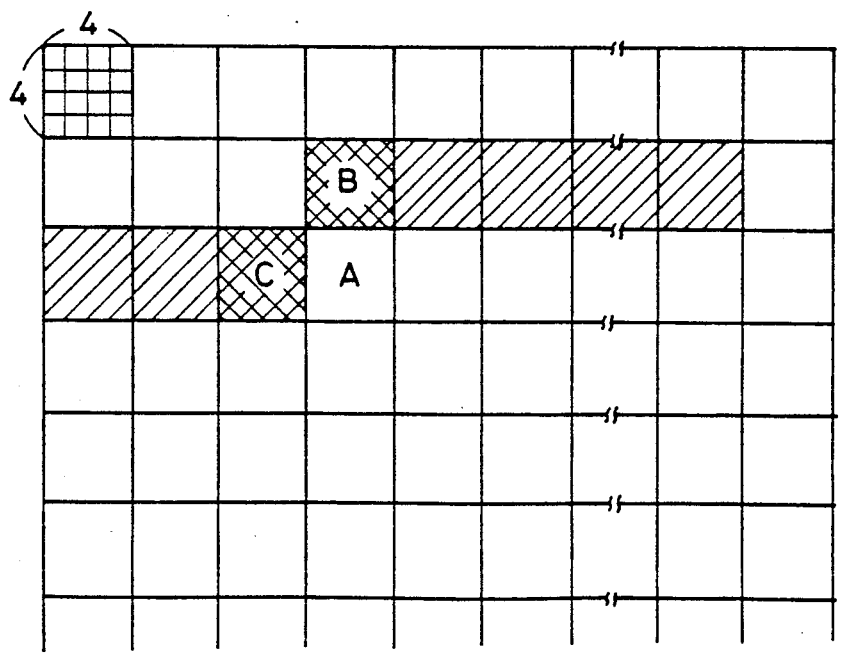
FIG. 17 is a view for explaining codes which are output from a decision table built in the decision making and control circuit of the second embodiment.
FIG. 18 is a view illustrating the positional relationship between an area (block) being processed and neighboring areas (blocks)

FIG. 17 shows 4-bit codes FC1, FC0, DC1 and DC0, which are output from the ROM 1601 as decision results #1 and #2. The data selector 1603 selects one of the decision results #1 and #2. The comparator 1604 generates a control signal which controls the switching operation of the data selector 1603. In order to generate the control signal, the comparator 1604 discerns whether or not the decision result relating to the data in the block positioned in the line preceding the line being processed by one line coincides with the decision result relating to the data of the block immediately prior to the block being processed. When both the decision results coincide with each other, the comparator 1604 controls the data selector 1603 to select the decision result #2. On the other hand, when both the decision results do not coincide with each other, the comparator 1604 controls the data selector 1603 to select the decision result #1.

Referring to FIG. 18, when a block A is being processed, data relating to blocks B and C are used for selecting one of the decision results #1 and #2. The block B has the same column position as the block A, and is positioned at the line prior to the line having block A by one line in the sub-scanning direction. The block C is positioned at the same line as the block A, and precedes the block A by one block in the main scanning direction. The selected decision results relating to the shaded blocks amounting to one line are stored in the FIFO memory 1606, and the selected decision result relating to block C is stored in the latch element 1607 which is a D-type flip-flop.

The selected decision selected by the data selector 1603 is supplied to the FIFO memory 1606 and 1608, and is written therein for every block. The FIFO memory 1606 is a memory used for storing data included in blocks amounting to one line. The data is read out from the FIFO memory 1606 for every block. The data is read out from the FIFO memory 1608 for every four pixels, because the FIFO memory 1608 is used for actually switching the image processing modes. The timing signal D derived from the timing signal generator 110 is supplied to the gate 1602, and the timing signal I derived therefrom is also supplied to the gate 1602 through an inverter connected to an input terminal thereof. An output timing signal from the gate 1602 is supplied to read clock input terminals (RCK) of the FIFO memories 1606 and 1608, and a write clock input terminal (WCK) of the FIFO memory 1606. The output timing signal from the gate 1602 is also supplied to the latch element 1607. A write clock input terminal (WCK) of the FIFO memory 1608 is supplied directly to the timing signal D.

The black detection signal supplied from the black component detection circuit 114 is supplied to the comparator 1605, which produces an output signal only when the black detection signal exceeds a fixed threshold value. The output signal is supplied, as a switch control signal, to the data selector 1609 through the FIFO memory 1608. When the switch control signal is supplied to the data selector 1609, an output inhibiting code is selected, which consists of consisting of four bits where FC1="1", FC0="0", DC1="x", and DC0="x".

In this manner, the image processing control codes FC1, FC0, DC1 and DC0 are generated for each of yellow (Y), Magenta (M) and cyanogen (C), and the image processing control codes FB1, FB0, DB1 and DB0 are generated for black (Bk). Those image processing control codes are supplied, as high-order addresses, to the filter parameter ROM 1001 and the dither pattern ROM 1003.

FIG. 19 shows combinations of the image processing control codes and the contents of the image processing modes selected thereby. The image processing control codes FC1, FB1, FC0 and FB0 are used for selecting one of the filter parameters suitable for smoothing (F1), edge emphasizing (F2), all-zero-outputting operation (F3), and no filtering operation. The image processing control codes DC1, DB1, DC0 and DB0 are used for selecting one of the dot concentration pattern D1, the dot scattering pattern D2 and the binarization pattern D3. In this way, the decision making and control circuit of FIG. 16 makes a decision on the area type of concern, and the optimum image processing mode is set in the image processing circuit by adaptively selecting the combination of the filter parameter and the dither pattern.

A description is given of an example of the image processing according to the above-mentioned second embodiment of the present invention. When the counters 111, 112, 113, 114 and 115 relating to the level detection circuit 104, the dot detection circuit 105, the edge detection circuit 106, the black component detection circuit 107, and the level detection circuit 108, have count values of 5, 12, 9, 3 and 1, respectively. In this case, the ROM 1601 having the decision making table built in the decision making and control circuit 116, determines that the counter 112 relating to the dot detection circuit 105 has the largest count value. This is the decision result #1. Also, the ROM 1601 determines that the counter 113 relating to the edge detection circuit 106 has the second largest value. This is the decision result #2. Then, the decision result relating to the decision result #2 is compared with the decision result relating to block C and the decision result relating to block B shown in FIG. 18. When the coincidence stands, the block A being processed is determined to be a character area, because it has been decided that the peripheral blocks B and C are character areas. In this case, the image processing mode optimum to the character area is selected. In other cases, the block A is decided as the dot area, and the image processing mode optimum to the dot area is selected.

It is noted that by using, as factors for decision making, peripheral blocks B and C with respect to the block A of concern, it becomes possible to effectively avoid erroneous decision making due to the fact that each area detection circuits cannot determine the area type with high accuracy. Therefore, the image processing mode most suitable for the area of concern is selected without error, and thereby improved quality of the recording image is obtained.

A description is given of a third embodiment of the present invention. The third embodiment has the block of hardware identical to that for the first and second embodiments. The third embodiment is different from the first and second embodiments in the following.

The decision making and control circuit 116 decides the type of area of concern, and controls the image processing circuit consisting of the filter circuit 117 and the dither circuit 118 on the basis of the decision result. As shown in FIG. 13, the decision making and control circuit 116 used in the third embodiment basically includes the PLA circuit 1301 and the FIFO memory 1302. The PLA circuit 1301 mutually compares counter values derived from the counters 111 to 115, and generates the codes shown in FIG. 14 based on the comparison result. In the embodiment, each counter value consists of four bits, and therefore assumes numerals of 0 to 15 in decimal notation. The counter values has the following meanings.

(1) The possibility that the area of concern is a photograph, increases with an increase of the count value of the counter 111.

(2) The possibility that the area of concern is a dot image, increases with an increase of the count value of the counter 112.

(3) The possibility that the area of concern is a character area, increases with an increase of the count value of the counter 113.

(4) The possibility that the area of concern is a black/white area, increases with an increase of the count value of the counter 114.

(5) The possibility that the area of concern is a plane portion (background portion) of the document, increases with an increase of the count value of the counter 115.

The decision making and control circuit 116 determines the optimum image processing mode based on the counter values of the counters 111 to 115. The decision making and control circuit 116 estimates the type of the area of concern, and controls the filter circuit 117 and the dither circuit 118 on the basis of the estimate.

As described previously with reference to FIG. 14, the decision making and control circuit 116 of the first embodiment determines the type of area of concern by detecting the largest count value of the counters 111 to 113. It is noted that each of the counters 111 to 115 generates the count values consisting of four bits. This makes it possible to provide $2^{20}$ different decision results on the basis of the count values each represented by four bits. The third embodiment is based on the above-mentioned viewpoints.

For example, the following image processing is possible. When the count value of the counter 112 is equal to or larger than a predetermined fixed value even when the counter 113 has the largest count value, the decision making and control circuit 116 gives priority to the count value of the counter 112 and has the image processing circuit carry out the image processing most suitable for dot images without performing the image processing suitable for characters. It is noted that there is the possibility that an edge of a dot image is detected as an edge of a character image, because a character area is detected by extracting an edge portion of a character. With the above-mentioned image processing, it becomes possible to prevent the erroneous operation.

Another example is described below. It is assumed that one of the counters 111 or 113 has the largest count value, and the other has the second largest value, and that the difference between the largest count value and the second largest count value is equal to or smaller than a predetermined fixed value. In this case, a sixth image processing mode which is not shown in FIG. 14, is selected and performed. The sixth image processing mode is suitable for a case where an area of concern has features of both characters and photographs or a case where noise exists on the document The sixth image processing mode is also suitable for a case where an error occurs in at least one of the detection circuits 105 to 109. For example, when the detection result including noise is used for decision making, the reproduced image may be partially discontinuous, which leads to deterioration in the quality thereof. In such cases, according to the sixth embodiment, the area of concern is not classified into the character area nor photograph area, and is determined to have the features of both the photographs and characters. Then, the sixth image processing mode is selected which is an intermediate image processing mode suitable for photographs and characters.

The intermediate image processing mode provides the quality of images which is lower than that provided by the image processing mode specifically suitable for photographs or the image processing mode specifically suitable for characters. However, the intermediate image processing mode presents an improved quality of images, compared with the case where the image processing specifically suitable for photographs is applied to characters or the case where the image processing specifically suitable for characters is applied to photographs. Further, the concept of ambiguity or fazziness is introduced in the third embodiment, because an increased number of decision results are used in the third embodiment. For example, it is possible to obtain 11 different decision results as shown in Table 1.

TABLE 1

| Decision Result Number | Probability Characters | Probability of Photographs |
|---|---|---|
| 0 | 0 | 100 |
| 1 | 10 | 90 |
| 2 | 20 | 80 |
| 3 | 30 | 70 |
| 4 | 40 | 60 |
| 5 | 50 | 50 |
| 6 | 60 | 40 |
| 7 | 70 | 30 |
| 8 | 80 | 20 |
| 9 | 90 | 10 |
| 10 | 100 | 0 |

Table 1 shows that the probability that the area of concern relates to characters increases, and the probability that it relates to photographs decreases as the decision result number increases. As described above, in the third embodiment, decision is not made so as to uniformly classify the area of concern into the character area or the photograph area. That is, decision by the third embodiment is made by calculating the probability that the area of concern relates to characters and photographs, and the optimum image processing mode is selected on the basis of the calculated probability. The intermediate image processing mode is available by changing the filter parameters to be set in the filter circuit 1002 shown in FIG. 10 and the dither pattern to be set in the dither circuit 1003.

A description is given of the decision making and control circuit 116 of the third embodiment where the intermediate image processing mode is employed. The structure for the decision making and control circuit 116 is based on the structure of the image processing circuit. The image processing circuit consists of the filter circuit 117 and the dither circuit 118 for gradation process, as shown in FIGS. 1 and 10. The filter circuit 1002 carries out smoothing of image data and edge emphasizing. The dither circuit 1004 converts the multi-level image data into image data represented by several tone levels (8 tone levels in the present embodiment). The filter circuit 1002 and the dither circuit 1004 must be provided with parameters, and the image processing mode is determined by the contents of those parameters. In the embodiment, the filter circuit 1002 is provided with 6 bit × 25 filter parameters, and the dither circuit 1004 is provided with 4 bit × 16 filter parameters which construct the dither patterns. The parameters for the filter circuit 1002 and the dither circuit 1004 are stored in the filter parameter ROM 1001 and the dither pattern ROM 1003, respectively. The desired parameters can be read out from the ROMs 1001 and 1003 by changing the addresses to be supplied thereto (high order addresses, as described previously). When a 256 kbit ROM is used to constitute each of the ROMs 1001 and 1003 there are obtained approximately 1024 different filter parameters, and approximately 2048 different dither patterns.

TABLE 2 shows examples of the filter parameters stored in the filter parameter ROM 1001 which correspond to the decision result numbers.

TABLE 2

| Decision Result Number | Filter Parameters |
|---|---|
| 0 | Smoothing #5 |
| 1 | Smoothing #4 |
| 2 | Smoothing #3 |
| 3 | Smoothing #2 |
| 4 | Smoothing #1 |
| 5 | Through |

TABLE 2-continued

| Decision Result Number | Filter Parameters |
| --- | --- |
| 6 | Edge Emphasizing #1 |
| 7 | Edge Emphasizing #2 |
| 8 | Edge Emphasizing #3 |
| 9 | Edge Emphasizing #4 |
| 10 | Edge Emphasizing #5 |

"Smoothing" corresponds to the filter parameters as shown in FIG. 11A, and "edge emphasizing" corresponds to the filter parameters as shown in FIG. 11B. Further, "through" corresponds to the filter parameters as shown in FIG. 11D. As the number of filter parameters increases, an increased effect of the processing attached thereto is obtained. That is, by changing weighting factors for a center portion and a spherical portion of the matrix, the filtering characteristics, namely image processing modes can be altered. For example, in the filter parameters of FIG. 11A, when coefficients positioned in the center portion of the matrix is selected so as to become larger than 4/36, the effect of smoothing becomes smaller. Adversely when coefficients positioned in the center portion of the matrix is increased, the effect of smoothing becomes stronger.

It can be seen from the above-mentioned description that as the probability that the area of concern relates to characters increases, the effect of edge emphasizing is increased, and on the other hand, as the probability that the area of concern relates to photographs increases, the effect of smoothing is increased. In this manner, the optimum image processing can be selected, depending on the type of areas. Additionally, by using the single image processing circuit (which is made up of the filter circuit 1002 and the dither circuit 1004 in the embodiment), it becomes possible to achieve various image processing modes. Each time when decision is made in the decision making and control circuit 106, the corresponding filter parameters and dither pattern are selected and then set in the filter circuit 1002 and the dither circuit 1004.

The aforementioned description in respect of the third embodiment relates to the case where only the level detection circuit 104 and the edge detection circuit 106 are used. This is because there is an opposite relationship between level detection and edge detection, which would help the understanding of the third embodiment. Actually, it is preferable to use the result of the dot detection circuit 105 in addition to the level and edge detection. That is, the image processing mode based on a correlation among the results of level, edge and dot detections are selected by adjusting filter parameters and dither pattern. Additionally, it is possible to determine the image processing mode based on a correlation between the results of the black component detection and the level detection for background portions of the document being processed. In this manner, various combinations of the contents of the filter parameters and dither patterns are obtainable, which leads to various image processing modes.

The present invention is not limited to the aforementioned embodiments, and variations and modification may be made without departing from the scope of the present invention.

What is claimed is:

1. A digital image processing apparatus comprising:
    dividing means for dividing digital input image data of an image into a plurality of blocks, each of said blocks defining an area having a predetermined size and pixel data forming said image;
    edge detecting means, coupled to said dividing means, for detecting an edge of said image for every pixel of each of said blocks and for outputting a first signal when the edge of said image is detected;
    dot image detecting means, coupled to said dividing means, for detecting pixel data forming a dot image contained in said image for every pixel of each of said blocks and for outputting a second signal when said pixel data forming the dot image is detected;
    level detecting means, coupled to said dividing means, for detecting pixel data forming a continuous image portion of said image for every pixel of each of said blocks and for outputting a third signal when said pixel data forming the continuous image portion is detected;
    counter means, coupled to said dividing means, said edge detecting means, said dot image detecting means and said level detecting means, for respectively counting said first signal, said second signal and said third signal and for outputting a control signal based on results of counting said first signal, said second signal and said third signal;
    image processing means, coupled to said counter means, for providing a plurality of different edge emphasizing processes, a plurality of different smoothing processes and a plurality of different dither processes; and
    control means, coupled to said counter means and said image processing means, for selecting one of said different emphasizing processes, one of said different smoothing processes and one of said different dither processes on the basis of said control signal output by said counter means and for subjecting said digital input image data to said one of said different emphasizing processes, said one of said different smooth processes and said one of said different dither processes.

2. A digital image processing apparatus as claimed in claim 1, wherein said counter means respectively counts said first signal, said second signal and said third signal for each of predetermined colors.

3. A digital image processing apparatus as claimed in claim 2, further comprising:
    first color processing means for generating, from said digital input image data, a first group of color signals respectively showing said predetermined colors; and
    second color processing means for generating, from said digital input image data, a second group of color signals which is different from said first group of color signals.

4. A digital image processing apparatus as claimed in claim 2, further comprising:
    delay means for delaying said second group of color signals for every said block until said counter means generates said signal.

5. A digital image processing apparatus comprising:
    dividing means for dividing digital input image data of an image into a plurality of blocks, each of said blocks defining an area having a predetermined size and pixel data forming said image;
    edge detecting means, coupled to said dividing means, for detecting an edge of said image for every pixel of each of said blocks and for outputting a first signal when the edge of said image is detected;

dot image detecting means, coupled to said dividing means, for detecting pixel data forming a dot image contained in said image for every pixel of each of said blocks and for outputting a second signal when said pixel data forming the dot image is detected;

level detecting means, coupled to said dividing means, for detecting pixel data forming a continuous image portion of said image or every pixel of each of said block and for outputting a third signal when said pixel data forming the continuous image portion is detected;

counter means, coupled to said dividing means, said edge detecting means, said dot image detecting means and said level detecting means, for respectively counting said first signal, said second signal and said third signal and for outputting a control signal based on results of counting said first signal, said second signal and said third signal;

image processing means, coupled to said counter means, for providing a plurality of different edge emphasizing processes, a plurality of different smoothing processes and a plurality of different dither processes; and control means, coupled to said counter means and said image processing means, for first selecting two of said different edge emphasizing processes, two of said different smoothing processes and two of said different dither processes on the basis of said control signal output by said counter means and second selecting one of said two of the different edge emphasizing processes, one of said two different smoothing processes and one of said two of different dither processes on the basis of information about which emphasizing process, smoothing process and dither process are subjected to an adjacent block adjacent to one of the blocks of interest and for subjecting said one of the blocks of interest to said one of the two of different edge emphasizing processes, said one of the two of the different smoothing processes and said one of the two of the different dither processes.

6. A digital image processing apparatus as claimed in claim 5, wherein said counter means respectively counts said first signal, said second signal and said third signal for each of predetermined colors.

7. A digital image processing apparatus as claimed in claim 6, further comprising:

first color processing means for generating, from said digital input image data, a first group of color signals respectively showing said predetermined colors; and second color processing means for generating, from said digital input image data, a second group of color signals which is different from said first group of color signals.

8. A digital image processing apparatus as claimed in claim 6, further comprising delay means for delaying said second group of color signals for every said block until said counter means generates said control signal.

* * * * *